Sept. 17, 1963 W. H. PHILLIPS 3,104,079
VARIABLE-GEOMETRY WINGED REENTRY VEHICLE
Filed Oct. 7, 1960
2 Sheets-Sheet 1

INVENTOR
WILLIAM H. PHILLIPS

BY

ATTORNEYS

Sept. 17, 1963 W. H. PHILLIPS 3,104,079
VARIABLE-GEOMETRY WINGED REENTRY VEHICLE
Filed Oct. 7, 1960 2 Sheets-Sheet 2

INVENTOR
WILLIAM H. PHILLIPS

BY

ATTORNEYS

United States Patent Office
3,104,079
Patented Sept. 17, 1963

3,104,079
VARIABLE-GEOMETRY WINGED REENTRY VEHICLE
William H. Phillips, Hampton, Va., assignor to the United States of America as represented by the Administrator of the National Aeronautics and Space Administration
Filed Oct. 7, 1960, Ser. No. 61,329
6 Claims. (Cl. 244—1)
(Granted under Title 35, U.S. Code (1952), sec. 266)

The invention described herein may be manufactured and used by or for the Government of the United States of America for governmental purposes without the payment of any royalties thereon or therefor.

This invention relates generally to an aerospace vehicle, and more particularly to a manned vehicle capable of being launched through the earth's atmosphere into space where it may be accelerated to orbital or higher velocities for spatial operation; and which is further capable of reentering the atmosphere from space in a high drag, rapid deceleration attitude, from which it may be subsequently brought into a controlled glide and then landed at low speeds within a preselected area upon the earth's surface.

It is contemplated that, within the relatively near future, manned space satellites will be placed in orbit around the earth at altitudes which may vary from several hundred to several thousand miles. The satellite vehicles to be utilized in initiating this program will carry a single human occupant and will be capable of orbital operation of only limited duration, after which the vehicles must be returned through the atmosphere and landed upon the earth's surface without detrimental effect upon or injury of the occupant. Reentry and landing of these satellite vehicles may be accomplished by bringing the vehicle out of orbit by the firing of retrorockets at a predetermined point to reduce vehicle tangential velocity and place the vehicle in a predetermined reentry trajectory having a terminus in a large body of deep water. These pioneer space vehicles will be provided with a large, blunt leading edge surface including an ablation heat shield which, as the vehicle enters the earth's atmosphere, generates high aerodynamic drag to materially reduce the velocity of the vehicle. These vehicles will also be provided with a system of drogue and main parachutes deployable during the last stages of descent to the earth's surface to further reduce vehicle velocity to a level at which landing may be accomplished in a body of deep water without the development of impact loads high enough to damage the vehicle or injure the vehicle occupant. As the vehicles utilized in this program eventually become larger and more complex for prolonged orbital operation, increased crew capacity, and increased cargo or equipment carrying capabilities, the parachute retarded, water impact landing system, with all the attendant disadvantages of search and recovery associated therewith, will become more and more impractical, due to the difficulty of providing in such vehicles extremely large and fully operable parachute systems and storage space therefor, as well as heavier structural components to withstand even water cushioned landing impact. The present invention, in presenting an aerospace vehicle configuration capable of atmospheric reentry and controlled glide landing within a small preselected land area of the earth's surface, solves the problems associated with parachute retarded space vehicle descent and landing by completely eliminating the parachute landing system. The aerospace vehicle disclosed herein, moreover, is not only capable of orbital operation as a manned satellite vehicle limited in duration only by the capabilities of its life support system, but upon future establishment in permanent earth orbit of large manned space stations and laboratories, is capable of utilization as a ferry vehicle for resupply and crew relief operations in connection with support of these permanently orbiting manned satellites.

Accordingly, it is an object of the present invention to provide an aerospace vehicle operable in space capable of atmospheric reentry and controlled atmospheric glide flight and landing.

Another object of the instant invention is the provision of an aerospace vehicle capable of reentering the earth's atmosphere from space in a high drag attitude with a single fixed surface presented to the relative wind.

A still further object of the present invention is the provision of an aerospace vehicle capable of reentering the earth's atmosphere from space in an initial high drag attitude with a single fixed surface presented to the relative wind and having subsequent attitude reorientation capabilities.

Another still further object of the instant invention is the provision of an aerospace vehicle capable of reentering the earth's atmosphere in an initial high drag attitude with a single fixed surface presented to the relative wind, subsequent attitude reorientation, and atmospheric glide flight and landing.

Still another object of the present invention is the provision of an aerospace vehicle launchable from the earth's surface into space and capable of reentering the earth's atmosphere therefrom in an initial high drag attitude with a single fixed surface presented to the relative wind and subsequently capable of attitude reorientation, and having control surfaces and auxiliary lifting surfaces deployable after attitude reorientation to improve atmospheric glide and landing capabilities of the vehicle.

According to the present invention, the foregoing and other objects are obtained by providing, in an aerospace vehicle, a delta wing having a substantially flat lower surface, a fuselage provided with a human occupancy compartment extending longitudinally adjacent the upper surface of the delta wing, and control surfaces and auxiliary lifting surfaces pivotally mounted on the upper surface of the wing for movement between an extended position in which they extend beyond the planform periphery of the wing and a folded position in which they extend substantially upwardly from the upper surface of the delta wing and do not extend beyond the planform periphery thereof.

A more complete appreciation of the invention and many of the attendant advantages thereof will be readily apparent as the same becomes better understood by reference to the following detailed description when considered in connection with the accompanying drawings wherein.

Figure 1:
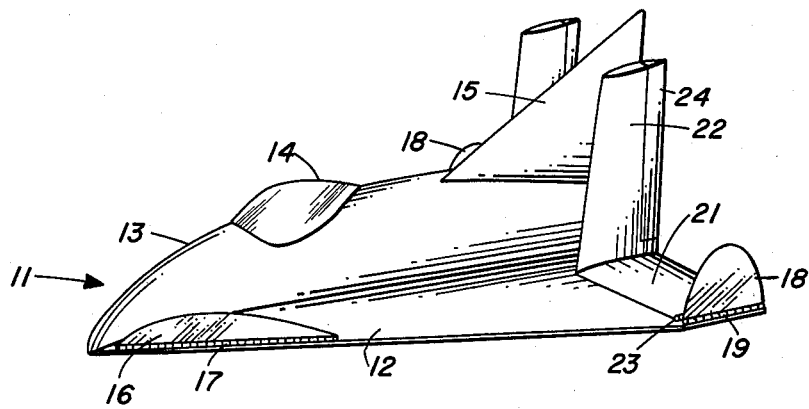
FIG. 1 is a perspective view of the aerospace vehicle with its control and auxiliary surfaces disposed in a folded position.
Figure 2:
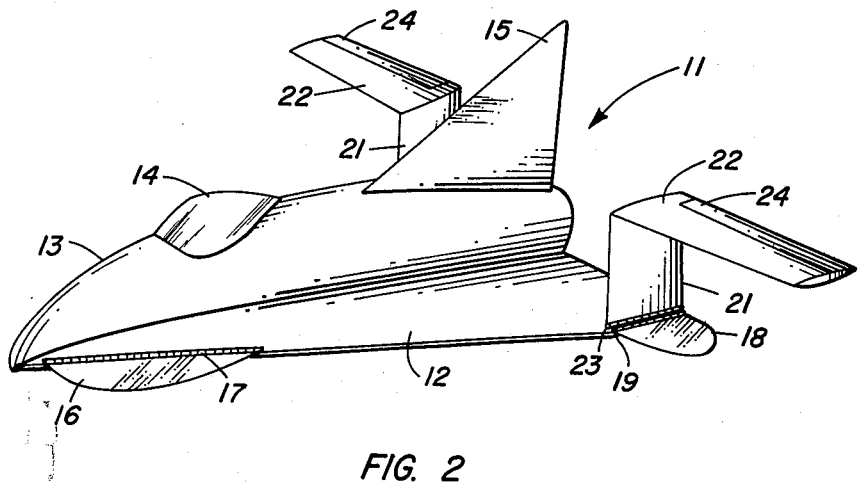
FIG. 2 is a perspective view of the aerospace vehicle with its control and auxiliary surfaces disposed in an extended position.
Figure 3:
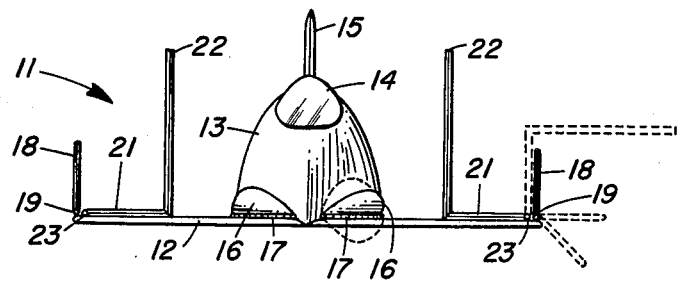
FIG. 3 is a front elevational view of the aerospace vehicle.

Referring now more particularly to the drawings, wherein like reference numerals designate identical parts throughout the several views, and more particularly to FIGS. 1 to 3, there is shown an aerospace vehicle, generally designated by the reference numeral 11. Vehicle 11 is provided with a delta wing 12 having a leading edge sweep on the order of 75 degrees and a substantially flat lower surface, which may be entirely planar throughout substantially its entire area or may be given a slight convex curvature thereover. The lower surface of wing 12, and the leading edges thereof, which are preferably somewhat rounded, are provided with a suitable conventional heat shield or the like, not shown, for protecting the base structure of wing 12 from aerodynamic heating, as will be more fully set forth hereinafter. Vehicle 11 is also provided with a fuselage 13 of more or less conventional supersonic configuration which is positioned completely above wing 12 and is interconnected with the upper surface thereof along the entire length of vehicle 11. Fuselage 13 includes a pilot-crew-passenger compartment therewithin, with at least the pilot's station surmounted by a suitable canopy 14. Fuselage 13 also carries a vertical stabilizer member 15 fixedly connected thereto and projecting upwardly from the upper surface thereof adjacent the after end thereof, and which is preferably provided with a conventional rudder control surface, not shown.

Wing 12 is provided with port and starboard forward control surfaces 16 hingedly connected by means of suitable linearly elongated hinge connections 17, illustrated somewhat schematically, to the upper surface thereof. The hinged connection 17 of each control surface 16 to wing 12 is disposed somewhat inwardly of the leading edge thereof in substantially parallel relation therewith. The inboard or base edge of each control surface 16 contiguous to hinged connection 17 is substantially straight; the remainder of the peripheral edge of each control surface 16 being of somewhat oval or semi-elliptical form. The span of each control surface 16, while being substantially less than the length thereof along the base or inboard edge, is such that the control surface may extend a significant distance beyond the leading edge of wing 12 when the surface is disposed in substantially parallel relation therewith. Wing 12 is also provided with port and starboard after control surfaces 18 hingedly connected to the upper surface thereof by means suitable linearly elongated hinge connections 19, also illustrated somewhat schematically. The hinged connection 19 of each control surface 18 to wing 12 is disposed somewhat inwardly of the leading edge thereof, and is also positioned in parallel relation with the longitudinal axis of vehicle 11; the leading edge of wing 12 adjacent each control surface 18 being swept to the forwardmost point of hinge 19, the remaining portion of the wing leading edge being parallel to the hinged connection 19. The base inboard edge of each control surface 18 contigious to hinged connection 19 is straight with the remainder of the peripheral edge thereof being substantially semi-circular in form. The base edge length of the control surfaces 18 is less than that of the surfaces 16, but the span thereof is greater, and surfaces 18 likewise extend a significant distance beyond the planform periphery of wing 12 when disposed in substantially parallel planar relation therewith. Surfaces 16 and 18 are located, respectively, as nearly adjacent the forward and after extremities of vehicle 11 as feasible. Suitable conventional actuating means, not shown, are provided in vehicle 11 for rotating each of the control surfaces 16 and 18 about the hinged connections thereof to the upper surface of wing 12 between a folded position in which the control surface extends substantially upwardly from the upper surface of wing 12, as shown in FIG. 1, and an extended position in which the control surface extends outwardly beyond the peripheral edge of wing 12, as shown in FIG. 2; the limits of control surface rotation being substantially shown in solid and in phantom outline in FIG. 3. The actuating means provided for each of the control surfaces 16 and 18 are such that any one of the surfaces may be rotated in either direction to a desired angle, either independently or simultaneously with the rotation in either direction of one or more of the other control surfaces, to provide pitching and rolling control for vehicle 11 when in atmospheric glide flight.

An auxiliary L-shaped lifting surface including a first leg 21 and a second leg 22 is positioned on each of the port and starboard portions of the upper surface of delta wing 12 in the vicinity of the trailing edge thereof. Each leg 21 and 22 of an auxiliary lifting surface is preferably formed as a substantially symmetric airfoil section, and one chordwise edge section of the leg 21 of each auxiliary surface is hingedly connected to the upper surface of wing 12 by means of a suitable linearly elongated hinge connection 23, illustrated somewhat schematically, located somewhat inboard of the hinged connection 19 of a control surface 18 and in parallel relation thereto. The leg 22 of each auxiliary surface is rigidly connected at substantially a right angle to the leg 21 thereof in chordwise relation thereto at the chordwise edge of the leg 21 spaced from the hinged connection 19. The auxiliary lifting surfaces rotate about the hinged connections 23 through substantially a right angle between a folded position in which the first legs 21 thereof extend inwardly from the hinged connections 23 toward the axis of symmetry of vehicle 11 in substantially abutting relation with the upper surface of wing 12, and in which the second legs 22 thereof extend substantially upwardly with respect to the upper surface of wing 12; and an extended position in which the first legs 21 thereof extend substantially vertically upwardly with respect to the upper surface of wing 12 from the hinged connection 23 therebetween, and in which the second legs 22 thereof extend outwardly beyond the planform periphery of wing 12. It will be apparent that the length of auxiliary lifting surface legs 21 between the chordwise end sections may be made greater than the span of control surfaces 18 in order that these control surfaces may be disposed in their folded position when the auxiliary lifting surfaces are disposed in an extended position, if desired. Conventional actuating means, not shown, are also provided in vehicle 11 for effecting rotation of the auxiliary lifting surfaces, as well as means for maintaining these surfaces in a desired position. The leg 22 of each auxiliary lifting surface also includes a conventional control surface 24 disposed along the trailing edge thereof actuable through a conventional electro-mechanical linkage with the pilot's controls to serve as roll and pitch control means for atmospheric glide flight. The trailing edge of the leg 21 of each auxiliary lifting surface may also be provided with a similar control surface to serve as yaw control means in atmospheric glide flight, if deemed desirable.

Aerospace vehicle 11 is also preferably provided with suitable means for generating propulsive thrust in a spatial vacuum, not shown, which may be used in driving the vehicle in space in any given relative direction as determined by vehicle attitude upon ignition. Steering rockets, not shown, are also preferably provided and suitably disposed in vehicle 11 for rotating vehicle 11 about its pitch, yaw, and roll axes to provide attitude reorientation in space.

Figure 4B:
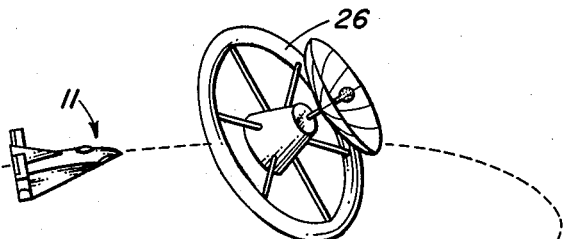
FIGS. 4a–4d illustrate the sequence of events in launching, orbiting operation, reentry, and glide landing of the aerospace vehicle.
Figure 4C:
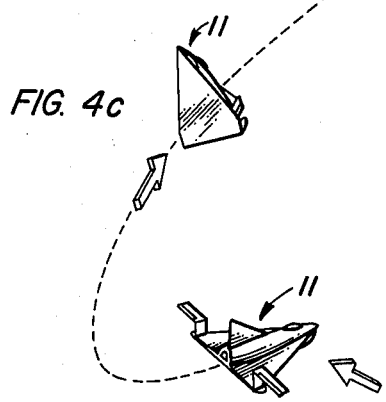
Figure 4A:
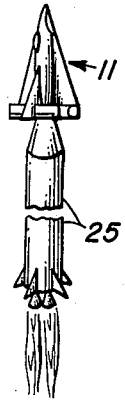
Figure 4D:
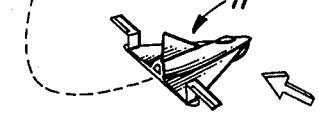

The particular significance of the aerospace vehicle configuration described hereinbefore may best be appreciated by following the vehicle 11 through one proposed type of mission in which it may readily be utilized, as sequentially illustrated in FIGS. 4a–4d. Vehicle 11 may be launched from the earth's surface as the payload of a rocket launch vehicle 25, as shown in FIG. 4a, with subsequent establishment in orbit in conventional manner. During this phase of the mission, vehicle 11 is longitudinally aligned with the direction of travel, with the deployable control surfaces and auxiliary lifting surfaces thereof disposed in their folded position to minimize drag. Since the launch vehicle 25 and payload aerospace vehicle 11 are well clear of the denser regions of the atmosphere before velocity thereof approaches its maximum, aerodynamic heating of the skin of vehicle 11 is not expected to create a critical problem at this time. This mission of aerospace vehicle 11 may be characterized as a resupply or crew relief operation for a permanently orbiting manned space station, and in FIG. 4b vehicle 11 is shown as it effects orbital rendezvous with such a space station 26. After accomplishing this operation, aerospace vehicle 11 may effect separation from space station 26 and take itself out of orbit through the application of retrothrust at a predetermined point above the earth's surface, descending thereto along a predetermined trajectory. Before entering the earth's atmosphere, the steering rockets provided for vehicle 11 are operated to bring the bottom surface of wing 12 into a position substantially normal to the path of travel of the vehicle so that the vehicle enters the atmosphere in a very high angle of attack attitude with respect to the relative wind, preferably on the order of 90 degrees, as shown in FIG. 4c. Maximum drag, with resulting maximum atmospheric deceleration of vehicle 11, is obtained in the high angle of attack reentry attitude, although the surfaces of the vehicle 11 exposed to the airstream are subjected to extremely severe aerodynamic heating. In order to neutralize the aerodynamic heating problem, the bottom and edges of the delta wing 12 are provided with the hereinbefore mentioned heat shield, and the control surfaces 16 and 18, as well as the auxiliary lifting surfaces of vehicle 11, are disposed in their folded position out of the airstream. When the forward velocity of vehicle 11 has been reduced to a matter of merely a few hundreds of miles per hour at an altitude of about 20 miles, vehicle 11 is pitched forwardly by extending control surfaces 18 outwardly into the airstream from their folded position, and the vehicle is brought into glide flight. The auxiliary lifting surfaces are then rotated from their folded position into their extended position, as shown in FIG. 4d, to improve the performance characteristics of vehicle 11 in atmospheric glide flight. Vehicle 11 is then glided into its preselected landing area at an angle of attack on the order of 20 to 30 degrees; significant course and distance control variation as desired being obtained through operation of the vehicle control system hereinbefore disclosed. It is, of course, deemed obvious that similar orbital missions of vehicle 11 may be accomplished without the necessity of orbital rendezvous with any other manned vehicle such as indicated in FIG. 4b.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aerospace vehicle operable in interplanetary space and having planetary atmospheric reentry capabilities, comprising a basic wing means having a substantially flat lower surface defining the basic planform profile of said vehicle whereby upon vehicle atmospheric reentry at high angles of attack said substantially flat lower surface constitutes the sole surface of said vehicle presented to the relative wind, control surface means foldable behind said lower surface upon atmospheric reentry and protected thereby from the relative wind yet extensible beyond the planform periphery of said basic wing, and auxiliary lifting surface means foldable behind said substantially flat lower wing surface upon atmospheric reentry and protected thereby from the relative wind yet extensible beyond the planform periphery of said basic wing.

2. The aerospace vehicle as defined in claim 1, including a human occupancy and control station located above the lower surface of said basic wing.

3. The aerospace vehicle as defined in claim 1, wherein said control surface means include a pair of symmetrically located forward control surfaces and a pair of symmetrically located aft control surfaces, each of said control surfaces having a linear base section hingedly connected therealong to the upper surface of said basic wing along a line disposed inwardly of said wing planform periphery in parallel relation therewith and a span greater than the distance between said hinged connection and said wing planform periphery, each of said control surfaces being rotatable about the hinged connection thereof to said basic wing between a folded position in which the control surface projects substantially vertically upwardly from the upper surface of said basic wing and an extended position in which the control surface extends beyond the planform periphery of said basic wing.

4. The aerospace vehicle as defined in claim 3, wherein said auxiliary lifting surface means include a pair of auxiliary wing members symmetrically located adjacent the after extremity of said vehicle, each of said auxiliary wing members having a linear base section hingedly connected to the upper surface of said basic wing along a line parallel to the axis of symmetry of said vehicle, each of said auxiliary wing members being rotatable about the hinged connection thereof to said basic wing between a folded position in which the auxiliary wing members lie completely within the planform periphery of said basic wing and an extended position in which a substantial portion of the auxiliary wing member extends beyond the planform periphery of said basic wing.

5. The aerospace vehicle as defined in claim 4, wherein each of said auxiliary wing member portions extensible beyond the planform periphery of said basic wing includes a control surface disposed along the trailing edge thereof.

6. The aerospace vehicle as defined in claim 5, wherein each of said auxiliary wing members is L-shaped in frontal elevation having a first leg including said linear base section hingedly connected to said basic wing upper surface, and a second leg substantially right angularly connected to said first leg including said auxiliary wing member control surface.

References Cited in the file of this patent

UNITED STATES PATENTS

| | | |
|---|---|---|
| 2,397,526 | Bonbright | Apr. 2, 1946 |
| 2,922,291 | Fox et al. | Jan. 26, 1960 |
| 2,925,233 | Dunn et al. | Feb. 16, 1960 |

OTHER REFERENCES

Aviation Week, Nov. 2, 1959, pages 96, 97, 98, "Space Technology."